United States Patent [19]
Woolwine

[11] Patent Number: 6,137,639
[45] Date of Patent: Oct. 24, 2000

[54] MAGNIFYING DEVICE

[76] Inventor: Constance A. Woolwine, 1843 Scotch Pine Dr., Beaver Creek, Ohio 45432-1855

[21] Appl. No.: 09/453,630

[22] Filed: Dec. 3, 1999

[51] Int. Cl.[7] .............................. G02B 27/02; G02B 7/02
[52] U.S. Cl. ............................................ 359/802; 359/822
[58] Field of Search .................................. 359/798–803, 359/806, 809, 810, 819, 822, 818

[56] References Cited

U.S. PATENT DOCUMENTS

| | | | |
|---|---|---|---|
| 164,575 | 1/1875 | McColl | 30/162 |
| 1,508,434 | 9/1924 | Ayers | 359/818 |
| 1,806,422 | 5/1931 | Shaen | 359/442 |
| 1,925,393 | 9/1933 | Lehman | 359/818 |
| 3,537,776 | 11/1970 | Connito | 359/809 |
| 5,245,477 | 9/1993 | Nayman | 359/818 |

*Primary Examiner*—Ricky Mack

[57] ABSTRACT

A magnifying device for reading price tags on a store shelf. The magnifying device includes a device for magnifying price tags which is mounted on a store shelf between opposing edges of a price tag holding bracket. The device has a clip adapted for holding the device to the price tag holding bracket. A base for mounting a magnifying member to the clip. The base has a first end and a second end. A cavity is located in the base and extends through the base. A securing means hingedly secures the clip to the second end of the base. The securing means has a first portion and a second portion. The first portion is fixedly secured to an end of the clip. The second portion is fixedly secured to the second end of the base. A magnifying member for magnifying objects is mounted within the cavity.

5 Claims, 2 Drawing Sheets

MAGNIFYING DEVICE

BACKGROUND OF THE INVENTION

1. Field of the Invention

The present invention relates to magnifying lenses and more particularly pertains to a new magnifying device for reading price tags on a store shelf.

2. Description of the Prior Art

The use of magnifying lenses is known in the prior art. More specifically, magnifying lenses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,537,776; U.S. Pat. No. 5,245,477; U.S. Pat. No. 164,575; U.S. Pat. No. 1,508,434; U.S. Pat. No. 1,806,422; and U.S. Pat. No. 1,925,393.

While these devices fulfill their respective, particular objectives and requirements, the aforementioned patents do not disclose a new magnifying device. The inventive device includes a device for magnifying price tags which is mounted on a store shelf between opposing edges of a price tag holding bracket. The device has a clip adapted for holding the device to the price tag holding bracket. A base for mounting a magnifying member to the clip. The base has a first end and a second end. A cavity is located in the base and extends through the base. A securing means hingedly secures the clip to the second end of the base. The securing means has a first portion and a second portion. The first portion is fixedly secured to an end of the clip. The second portion is fixedly secured to the second end of the base. A magnifying member for magnifying objects is mounted within the cavity.

In these respects, the magnifying device according to the present invention substantially departs from the conventional concepts and designs of the prior art, and in so doing provides an apparatus primarily developed for the purpose of reading price tags on a store shelf.

SUMMARY OF THE INVENTION

In view of the foregoing disadvantages inherent in the known types of magnifying lenses now present in the prior art, the present invention provides a new magnifying device construction wherein the same can be utilized for reading price tags on a store shelf.

The general purpose of the present invention, which will be described subsequently in greater detail, is to provide a new magnifying device apparatus and method which has many of the advantages of the magnifying lenses mentioned heretofore and many novel features that result in a new magnifying device which is not anticipated, rendered obvious, suggested, or even implied by any of the prior art magnifying lenses, either alone or in any combination thereof.

To attain this, the present invention generally comprises a device for magnifying price tags which is mounted on a store shelf between opposing edges of a price tag holding bracket. The device has a clip adapted for holding the device to the price tag holding bracket. A base for mounting a magnifying member to the clip. The base has a first end and a second end. A cavity is located in the base and extends through the base. A securing means hingedly secures the clip to the second end of the base. The securing means has a first portion and a second portion. The first portion is fixedly secured to an end of the clip. The second portion is fixedly secured to the second end of the base. A magnifying member for magnifying objects is mounted within the cavity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnifying device apparatus and method which has many of the advantages of the magnifying lenses mentioned heretofore and many novel features that result in a new magnifying device which is not anticipated, rendered obvious, suggested, or even implied by any of the prior art magnifying lenses, either alone or in any combination thereof.

It is another object of the present invention to provide a new magnifying device which may be easily and efficiently manufactured and marketed.

It is a further object of the present invention to provide a new magnifying device which is of a durable and reliable construction.

An even further object of the present invention is to provide a new magnifying device which is susceptible of a low cost of manufacture with regard to both materials and labor, and which accordingly is then susceptible of low prices of sale to the consuming public, thereby making such magnifying device economically available to the buying public.

Still yet another object of the present invention is to provide a new magnifying device which provides in the apparatuses and methods of the prior art some of the advantages thereof, while simultaneously overcoming some of the disadvantages normally associated therewith.

Still another object of the present invention is to provide a new magnifying device for reading price tags on a store shelf.

Yet another object of the present invention is to provide a new magnifying device which includes a device for magnifying price tags which is mounted on a store shelf between opposing edges of a price tag holding bracket. The device has a clip adapted for holding the device to the price tag holding bracket. A base for mounting a magnifying member to the clip. The base has a first end and a second end. A cavity is located in the base and extends through the base. A securing means hingedly secures the clip to the second end of the base. The securing means has a first portion and a second portion. The first portion is fixedly secured to an end of the clip. The second portion is fixedly secured to the second end of the base. A magnifying member for magnifying objects is mounted within the cavity.

Still yet another object of the present invention is to provide a new magnifying device that attaches to a store shelf adjacently to a price tag so that the device may be swung into a position such that the price tag is magnified for easier viewing.

Even still another object of the present invention is to provide a new magnifying device that will help the elderly and other consumers with bad eyesight by affording them the opportunity to clearly see the price tags.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
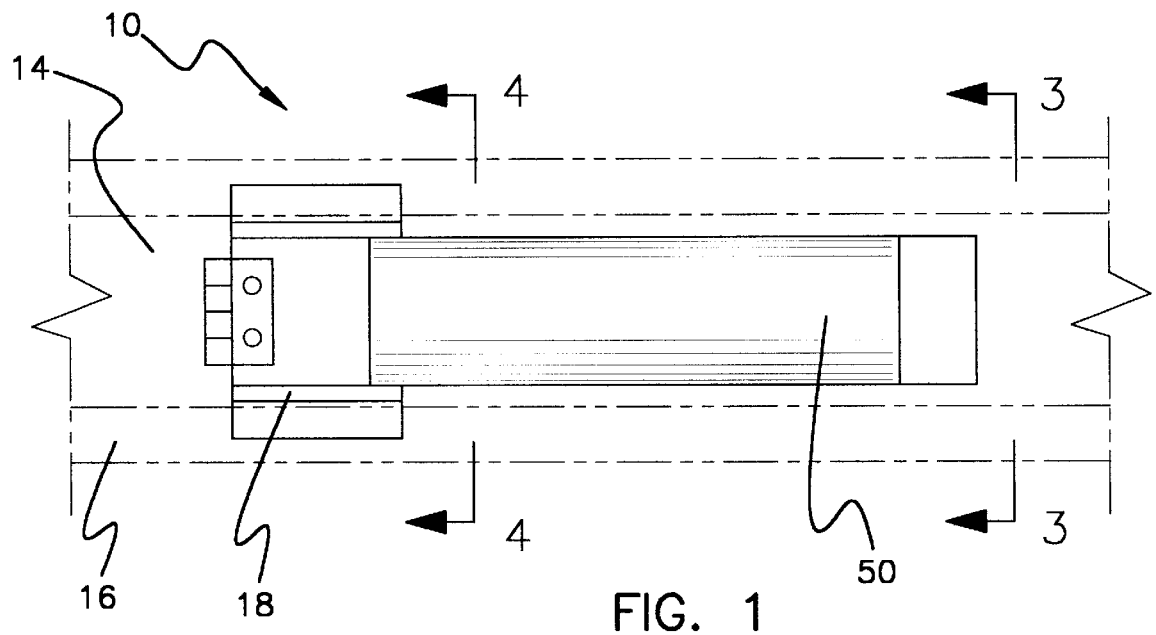
FIG. 1 is a schematic plan view of a new magnifying device according to the present invention.
Figure 2:
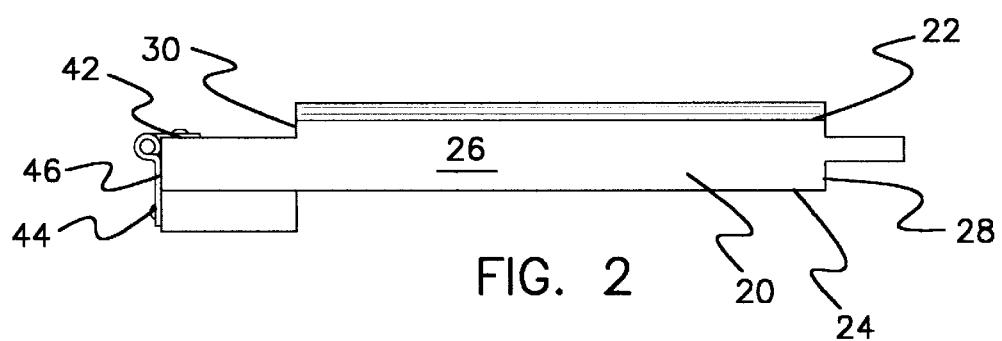
FIG. 2 is a schematic side view of the present invention.
Figure 3:
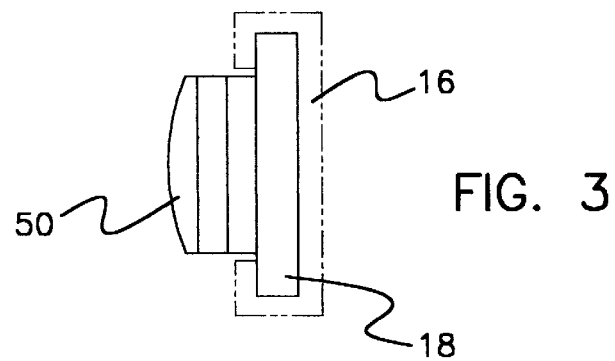
FIG. 3 is a schematic end view taken along line 3—3 of the present invention.
Figure 4:
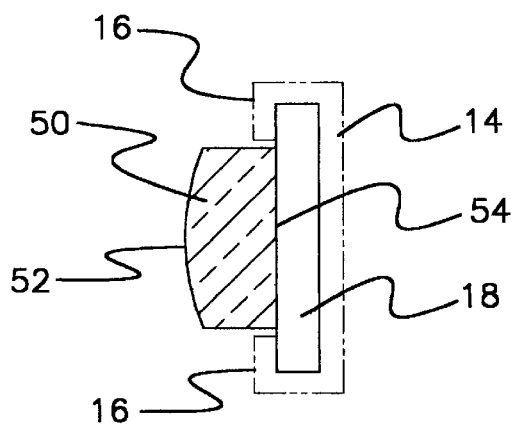
FIG. 4 is a schematic end view taken along line 4—4 of the present invention.
Figure 5:
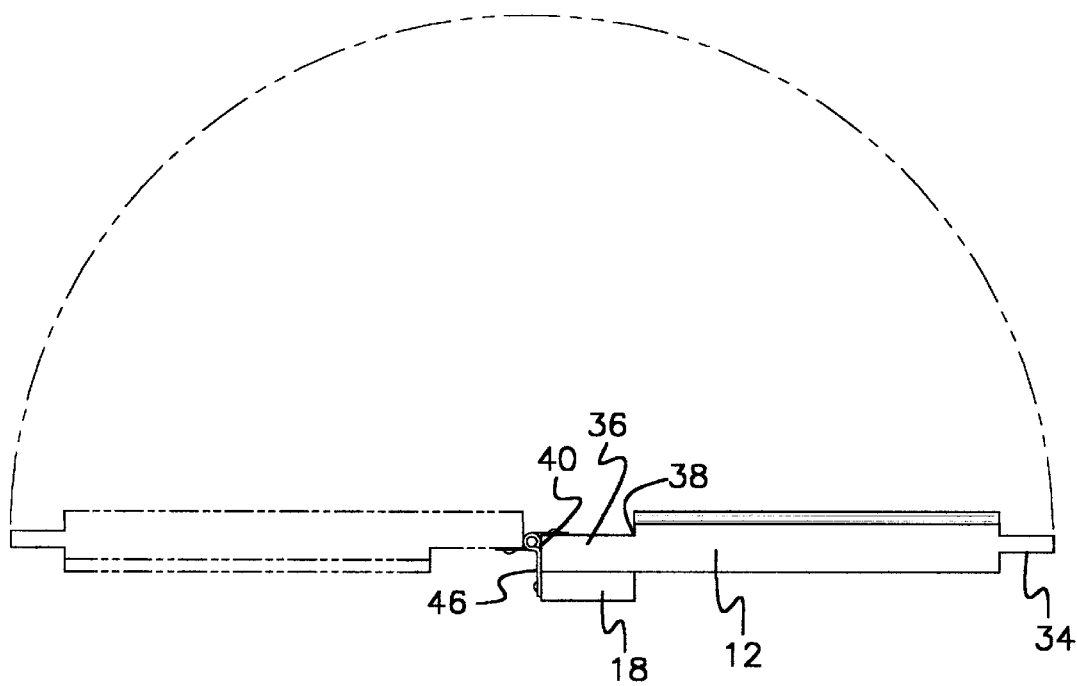
FIG. 5 is a schematic top view of the present invention demonstrating its movement.

With reference now to the drawings, and in particular to FIGS. 1 through 5 thereof, a new magnifying device embodying the principles and concepts of the present invention and generally designated by the reference numeral 10 will be described.

As best illustrated in FIGS. 1 through 5, the magnifying device 10 generally comprises a device 12 for magnifying price tags mounted on a store shelf between opposing edges 16 of a price tag holding bracket 14.

A clip 18 for holds the device to the price tag holding bracket. The clip 18 is inserted between the opposing edges 16 of the price tag holding bracket 14. Ideally, the clip 18 is generally rectangular.

A base 20 mounts the magnifying member 50 of the device to the clip 18. The base 20 has a front side 22 and a bottom side 24 with a peripheral edge 26 therebetween. The base 20 has a first end 28 and a second end 30 and is preferably rectangular.

A cavity in the base extends through the front 22 and bottom sides 24 of the base 20 and is preferably rectangular, however the shape of the cavity is dependent upon the shape of the magnifying member used.

A first arm 34 acts as a handle on the base 20. The first arm 34 is mounted to and extends away from the first side 28 of the base 20. The first arm 34 is located on the first side between the top side 22 and the bottom side 24 of the base. The first arm 34 is generally rectangular.

A second arm 36 has a first end 38 and a second end 40. The first end 38 of the second arm 36 is mounted to the second side 30 of the base 20, and the second end 40 of the second arm extends away from the second side 30 of the base. The second arm 36 is located generally adjacent to the bottom surface 24 of the base and is preferably rectangular.

A securing means hingedly secures the clip 18 to the second arm 36. The securing means has a first portion 42 and a second portion 44. The first portion 42 is fixedly secured to an end of the clip 18, and the second portion 44 is fixedly secured to the second end 40 of the second arm 36. The securing means is a hinge 46.

The magnifying member 50 for magnifying objects has a top surface 52, a bottom surface 54 and a periphery therebetween. The magnifying member 50 is elongate and is generally rectangular. The top surface 52 of the magnifying member is convex. Preferably, the magnifying member 50 is formed from plastic, although it could be formed from glass or other transparent material. The bottom surface 54 of the magnifying glass is mounted within the cavity such that the top surface of the magnifying member is adjacent to a top side 22 of the base.

In use, the base 20 may swing from a position adjacent to the price tag holding bracket 14 to a position away from the price tag holding bracket. When near the price tag holding bracket, the magnifying member is covering and adjacent to the price tag which allows the price tag to be magnified.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for magnifying price tags mounted on a store shelf between opposing edges of a price tag holding bracket, the device comprising:

a clip, said clip adapted for holding said device to said price tag holding bracket;

a base for mounting to said clip, said base having a first end and a second end;

a cavity in said base, said cavity extending through said base;

a securing means for hingedly securing said clip to said second end of said base, said securing means having a first portion and a second portion, said first portion being fixedly secured to an end of said clip, said second portion being fixedly secured to said second end of said base;

a magnifying member for magnifying objects, said magnifying member being mounted within said cavity.

2. The device for magnifying price tags mounted on a store shelf between opposing edges of a price tag holding bracket as in claim 1, the device further comprising:

wherein said base has a front side and a bottom side with a peripheral edge therebetween a first arm for acting as a handle on said base, said first arm being mounted to and extending away from said first side of said base, said first arm being located on said first side between said top side and said bottom side of said base.

3. The device for magnifying price tags mounted on a store shelf between opposing edges of a price tag holding bracket as in claim 2, the device further comprising:

a second arm, said second arm having a first end and a second end, said first end of said second arm being mounted to said second side of said base, said second end of said second arm extending away from said second side of said base, said second arm being located generally adjacent to said bottom surface of said base; and said securing means having a first portion and a second portion, said first portion being fixedly secured to an end of said clip, said second portion being fixedly secured to said second end of said second arm, said securing means being a hinge.

4. The device for magnifying price tags mounted on a store shelf between opposing edges of a price tag holding bracket as in claim 1, and further comprising:

wherein said base has a front side and a bottom side with a peripheral edge therebetween; and said magnifying member having a top surface, a bottom surface and a periphery therebetween, said magnifying member being elongate, said top surface of said magnifying member being convex, said magnifying member being formed from plastic, said bottom surface of said magnifying member being mounted within said cavity such that said top surface of said magnifying glass is adjacent to a top side of said base.

5. A device for magnifying price tags mounted on a store shelf between opposing edges of a price tag holding bracket, the device comprising:

a clip for holding said device to said price tag holding bracket, wherein said clip is inserted between said opposing edges of said price tag holding bracket;

a base for mounting the device to said clip, said base having a front side and a bottom side with a peripheral edge therebetween, said base having a first end and a second end;

a cavity in said base, said cavity extending through said front and bottom sides of said base;

a first arm for acting as a handle on said base, said first arm being mounted to and extending away from said first side of said base, said first arm being located on said first side between said top side and said bottom side of said base;

a second arm, said second arm having a first end and a second end, said first end of said second arm being mounted to said second side of said base, said second end of said second arm extending away from said second side of said base, said second arm being located generally adjacent to said bottom surface of said base;

a securing means for hingedly securing said clip to said second arm, said securing means having a first portion and a second portion, said first portion being fixedly secured to an end of said clip, said second portion being fixedly secured to said second end of said second arm, said securing means being a hinge;

a magnifying member for magnifying objects, said magnifying member having a top surface, a bottom surface and a periphery therebetween, said magnifying member being elongate, said top surface of said magnifying member being convex, said magnifying member being formed from plastic, said bottom surface of said magnifying glass being mounted within said cavity such that said top surface of said magnifying member is adjacent to a top side of said base; and wherein said base may swing from a position adjacent to said price tag holding bracket to a position away from said price tag holding bracket.

\* \* \* \* \*